(12) United States Patent
Joh

(10) Patent No.: US 8,804,207 B2
(45) Date of Patent: Aug. 12, 2014

(54) IMAGE READING APPARATUS AND CONTROLLING METHOD THEREOF

(75) Inventor: Seung-je Joh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 237 days.

(21) Appl. No.: 13/200,368

(22) Filed: Sep. 23, 2011

(65) Prior Publication Data

US 2012/0170083 A1 Jul. 5, 2012

(30) Foreign Application Priority Data

Jan. 4, 2011 (KR) ........................ 10-2011-0000562

(51) Int. Cl.
*H04N 1/04* (2006.01)
(52) U.S. Cl.
USPC ............ 358/475; 358/474; 358/496; 358/498
(58) Field of Classification Search
USPC .......................... 358/475, 474, 496, 498, 408
See application file for complete search history.

(56) References Cited

U.S. PATENT DOCUMENTS 7,027,194 B2 * 4/2006 Kanda ........................... 358/496

FOREIGN PATENT DOCUMENTS

| EP | 1202551 | 5/2002 | |
|---|---|---|---|
| JP | 9-321947 | 12/1997 | |
| JP | 09-321947 | * 12/1997 | ............... H04N 1/04 |
| JP | 2001-339576 | 12/2001 | |
| JP | 2002-111977 | 4/2002 | |
| WO | 2012/013499 | 2/2012 | |

OTHER PUBLICATIONS

Extended European Search Report issued Sep. 24, 2012 in corresponding European Patent Application No. 11195522.5.

* cited by examiner

*Primary Examiner* — Houshang Safaipour
(74) *Attorney, Agent, or Firm* — Staas & Halsey LLP

(57) ABSTRACT

An image reading apparatus which supports a both-side scan mode and a controlling method thereof. The image reading apparatus includes: an automatic paper transfer unit which automatically transfers a papers; a first scanning unit which comprises a first light source and scans a first side of the paper; a second scanning unit which comprises a second light source and scans a second side of the paper; and a controller which controls the first and second light sources to be alternately lit on a plurality of times within a cycle of a preset signal when the paper is transferred to the automatic paper transfer unit.

20 Claims, 17 Drawing Sheets

IMAGE READING APPARATUS AND CONTROLLING METHOD THEREOF

CROSS-REFERENCE TO RELATED APPLICATIONS

This application claims priority from Korean Patent Application No. 10-2011-0000562, filed on Jan. 4, 2011, in the Korean Intellectual Property Office, the disclosure of which is incorporated herein by reference in its entirety.

BACKGROUND

1. Field

Apparatuses consistent with exemplary embodiments relate to an image reading apparatus and a controlling method thereof, and more particularly, to an image reading apparatus which can perform doth-side scanning and a controlling method thereof.

2. Description of the Related Art

An image reading apparatus is an apparatus which scans an original image such as a document, a picture, a film, or the like and converts the original image into digital data. In this case, the digital data is displayed on a monitor of a computer or is printed by a printer to be generated as an output image. The image reading apparatus can be used in a scanner which generates digital data, a fax machine which provides a faxing function, a copier which provides a copying function, a multifunction peripheral (MFP). Etc.

FIGS. 1A and 1B are views illustrating problems of a related art.

As shown in FIG. 1A, a scanner which can scan both sides of a sheet of paper on a paper path is disposed to reduce an increase in a scan speed and apparatus complexity of a double-sided structure. An original image is transferred using the paper path so that front and back sides of the original image, i.e., both sides, are simultaneously scanned through only one-time original image transfer. In this case, scan modules 10, 20 receive a signal from a scan module controller to operate according to the signal and controls devices necessary for reading an image, such as an image sensor, an analog front-end (AFE), etc.

In general, the scan modules 10, 20 are disposed close to one another to improve operation efficiency of a double-sided scan system. Therefore, a back side of an original image is shown due to crosstalk of illuminators 11, 21 of the scan modules 10, 20.

In other words, in such a structure, two image sensor modules 12, 22 are disposed adjacent to each other and thus simultaneously operate. Therefore, a back side of an original image is projected and scanned on a reading image sensor 12 by an illuminator 21 of a counterpart image sensor 22.

As the two scan modules 10, 20 (image reading modules) are disposed close to each other, a movement section of a paper sheet is reduced, thereby increasing the scan speed and minimizing an instrumental size of a scanner. Also, it is easy to secure a length of a planar section 30 required to prevent shaking of the paper sheet in an image reading section.

However, as the two scan modules 10, 20 become close to each other, a showing phenomenon of a back side of the paper sheet increases due to the illuminators 11, 21 of the two scan modules as shown in FIG. 1B. Light emitted from the illuminator 11 of one of the two scan modules 10 passes through an imaging unit of the other scan module and then reaches an image sensor 22. Also, the showing phenomenon of the back side of the paper sheet occurs due to crosstalk of the illuminators 11, 21. In particular, the showing phenomenon becomes more serious according to a state of a copying paper.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an image reading apparatus which can control illuminators of scan modules and a controlling method thereof.

According to an aspect of an exemplary embodiment, there is provided an image reading apparatus supporting a both-side scan mode. The image reading apparatus may include: an automatic paper transfer unit which automatically transfers a papers; a first scanning unit which includes a first light source and scans a first side of the paper; a second scanning unit which includes a second light source and scans a second side of the paper; and a controller which controls the first and second light sources to be alternately lit on a plurality of times within a cycle of a preset signal when the paper is transferred to the automatic paper transfer unit.

The first and second scanning units may respectively further include image sensors which convert optical signal obtained by reading the paper into electric signals, wherein the controller controls the first and second light sources to be alternately lit on a plurality of times for one cycle of a line time of the image sensors.

The controller may control the first and second light sources to be alternately lit on for a scan sub-direction cycle of the first and second scanning units.

The controller may control the first and second light sources to be lit on the different numbers of times for one cycle of the preset signal.

The controller may control the first and second light sources so that lighting duties of the first and second light sources are different from each other for one cycle of the preset signal.

The controller may control the first and second light sources to be repeatedly lit on for a preset time within one cycle of the preset signal.

The controller may control the first and second light sources to be repeatedly lit off for a preset time within one cycle of the preset signal.

The controller may control alternate lighting cycles of the first and second light sources according to a distance cycle signal which depends on at least one of a motor cycle signal of the first and second scanning units, a line cycle signal of sub-scan direction image data, a scan sub-direction resolution, and a scan speed.

The image reading apparatus may further include: a first sensor unit which is installed in a paper entering area of the automatic paper transfer unit; and a second sensor unit which is installed in a paper discharging area of the automatic paper transfer unit, wherein the controller controls the first and second light sources to be alternately lit on based on sensing results of the first and second sensor units.

The controller may control light amounts of the first and second light sources in the alternate lighting to be different from each other and controls a scanned image to be compensated according to the adjusted light amounts.

According to an aspect of another exemplary embodiment, there is provided a method for controlling an image reading apparatus which supports a both-side scan mode and includes an automatic paper transfer unit which automatically transfers a paper, a first scanning unit which includes a first light source and scans a first side of the paper, a second scanning unit which includes a second light source and scans a second side of the paper and. The method may include: receiving a user command for both-side scanning; and alternately lighting on the first and second light sources a plurality of times for one cycle of a preset signal when the paper is transferred to the automatic paper transfer unit according to the user command.

The first and second scanning units may respectively further include image sensors which convert optical signal obtained by reading the paper into electric signals, wherein the first and second light sources are alternately lit on a plurality of times for one cycle of a line time of the image sensors.

The first and second light sources may be alternately lit on a plurality of times for a scan sub-direction cycle of the first and second scanning units.

The first and second light sources may be lit on the different numbers of times for one cycle of the preset signal.

The first and second light sources may be alternately lit on a plurality of times so that lighting duties of the first and second light sources are different from each other for one cycle of the preset signal.

The first and second light sources may be repeatedly lit on for a preset time within one cycle of the preset signal.

The first and second light sources may be repeatedly lit off for a preset time within one cycle of the preset signal.

Alternate lighting cycles of the first and second light sources may be controlled according to a distance cycle signal which depends on at least one of a motor cycle signal of the first and second scanning units, a line cycle signal of sub-scan direction image data, a scan sub-direction resolution, and a scan speed.

The image reading apparatus further include: a first sensor unit which is installed in a paper entering area of the automatic paper transfer unit; and a second sensor unit which is installed in a paper discharging area of the automatic paper transfer unit, wherein the first and second light sources are alternately lit on based on sensing results of the first and second sensor units.

The method may further include controlling light amounts of the first and second light sources in the alternate lighting to be different from each other and controlling a scanned image to be compensated according to the adjusted light amounts.

As described above, according to the exemplary embodiments, back side showing occurring due to crosstalk of illuminators of two scan modules in both-side scanning is prevented. Also, if an image is affected by controlling of the illuminators, this is compensated to read a clear image.

Additional aspects and advantages of the exemplary embodiments will be set forth in the detailed description, will be apparent from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1A:
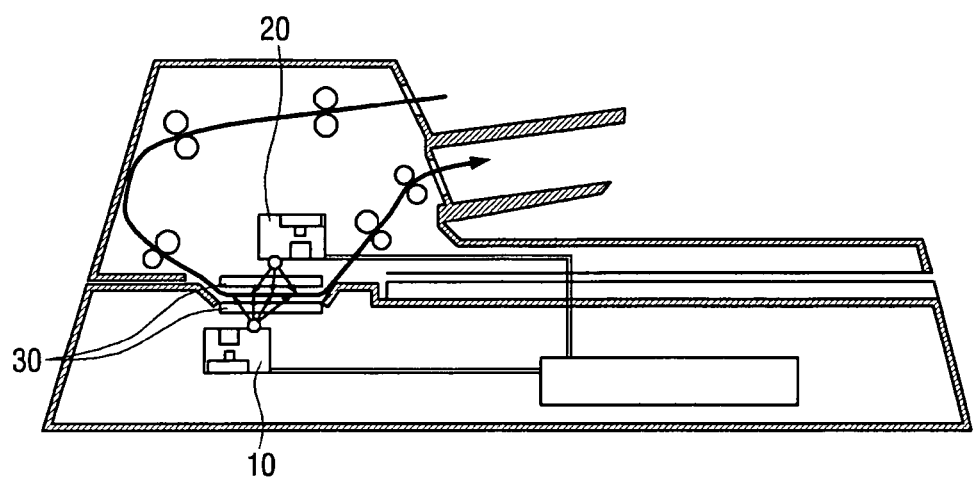
FIGS. 1A and 1B are views illustrating problems occurring according to a related-art.
Figure 1B:
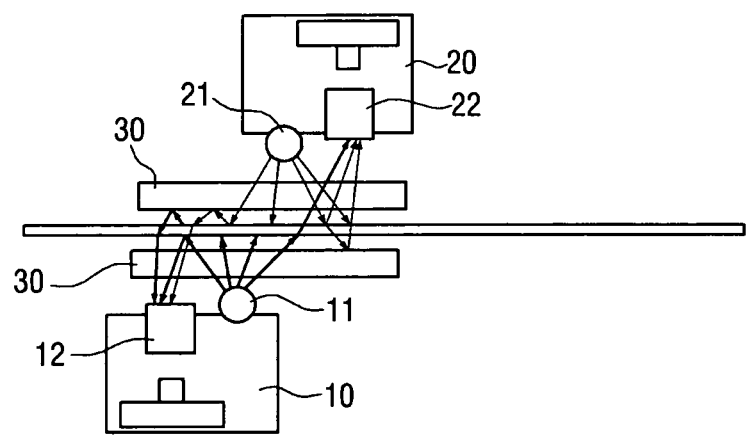

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2A:
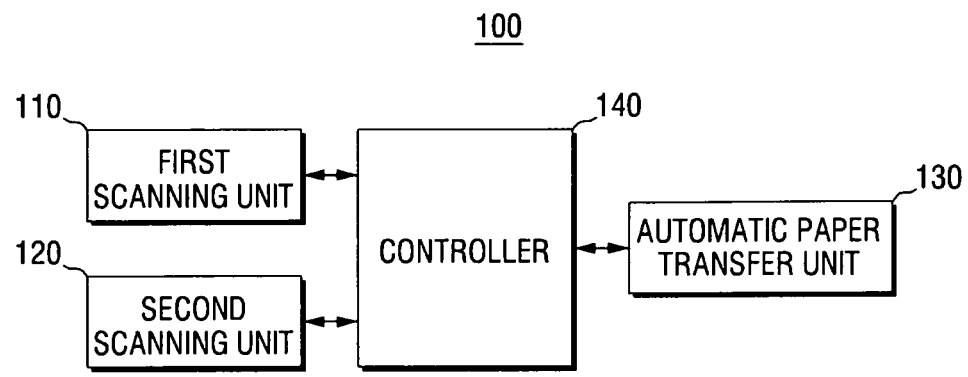
FIGS. 2A and 2B are block diagrams illustrating structures of image reading apparatuses according to various exemplary embodiments.
Figure 2B:
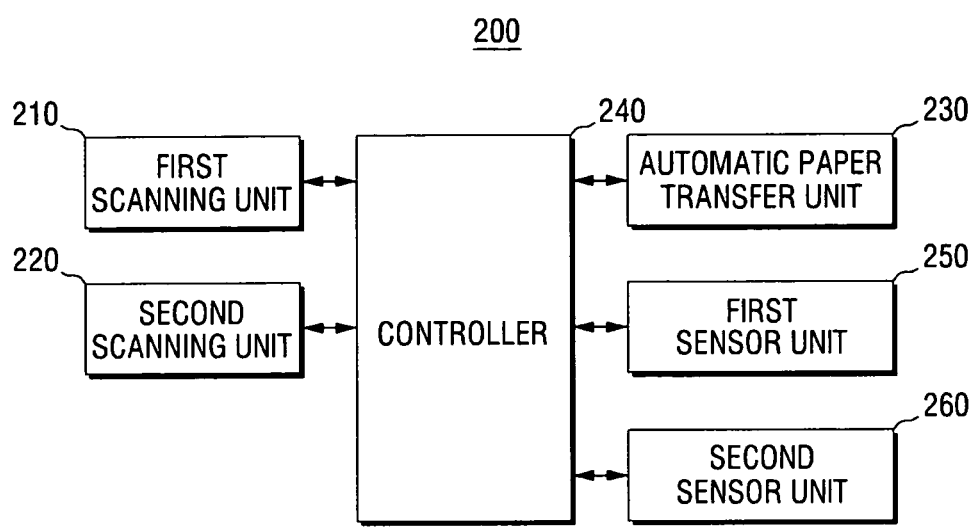

FIGS. 2A and 2B are block diagrams illustrating structures of image reading apparatuses according to various exemplary embodiments.

Referring to FIG. 2A, an image reading apparatus 100 according to the present exemplary embodiment includes a first scanning unit 110, a second scanning unit 120, an automatic paper transfer unit 130, and a controller 140.

The image reading apparatus 100 is an apparatus which scans light to read an image recorded on a paper. The image reading apparatus 100 may be installed in an image forming apparatus such as a copier, a printer, a fax machine, or a multifunction peripheral (MFP) which complexly realizes functions of them through one device.

In the image reading apparatus 100, the first scanning unit 110 which scans a first side of the paper and the second scanning unit 120 which scans a second side of the paper are installed to face each other in order to scan both sides of the paper, i.e., the first and second sides. In comparison with a method of reversing a transfer direction of a paper, this method has an advantage in that both sides of a paper are nearly simultaneously scanned without necessarily circulating the paper to enable high-speed both-side scanning.

The first scanning unit 110 scans the first side of the paper and may include a first light source which scans light onto the paper.

The second scanning unit 120 scans the second side of the paper and may include a second light source which scans light onto the paper.

Here, the first and second scanning units 110 and 120 may be realized as scanning modules which scan light onto the paper through their light sources, read a visible image printed on the paper as an optical signal, convert the optical signal into an electric signal, and provide the electric signal to a signal processing module (not shown).

The light sources may be realized as lamps, such as compact fluorescent lamps (CFLs) or Xe-Lamps, light-emitting diodes (LEDs), or the like.

The automatic paper transfer unit 130 automatically transfers the paper and may be realized as an automatic document feeder (ADF).

The controller 140 controls the first and second light sources of the first and second scanning units 110 and 120 to be alternately lighted on at least one time when the paper is transferred to the automatic paper transfer unit 130 in both-side scanning. In more detail, the controller 140 controls the first and second light sources to be alternately lighted on a plurality of times within one preset signal cycle.

The controller 140 may control the first and second light sources to be lighted on different times for the preset signal cycle.

The controller 140 controls the first and second light sources so that lighting duties of the first and second light sources are different from each other for the preset signal cycle.

The controller 140 controls the first and second light sources to be repeatedly lit for the preset one signal cycle The controller 140 controls the first and second light sources to be repeatedly switched off for the preset one signal cycle.

The first and second scanning units 110 and 120 respectively include first and second image sensors (not shown) which read the visible image printed on the paper, which is transferred through the automatic transfer unit 130, to acquire the optical signal and convert the optical signal into the electric signal. Here, charge-coupled devices (CCDs), contact image sensors (CISs), or the like may be used as image sensors.

In this case, the controller 140 controls the first and second light sources to be lit a plurality of times for one line time of the first and second image sensors.

The controller 140 synchronizes alternate lighting cycles of the first and second light sources with light time signals of the first and second image sensors.

The controller 140 controls the alternate lighting cycles of the first and second light sources according to a pulse width modulation (PWM) signal.

The controller 140 heightens a frequency of a PWM pulse to reduce a light deviation if the alternate lighting signal does not synchronize with the light time signals of the first and second image sensors.

The controller 140 changes the frequency and duty of the PWM pulse to minimize the light deviation.

The controller 140 controls the first and second light sources to be alternately lit at least one time for one cycle of scan sub-direction signals of the first and second scanning units 110 and 120.

The controller 140 synchronizes the alternate lighting cycles of the first and second light sources with the scan sub-direction cycle signals.

The controller 140 controls the first and second light sources to be alternately lit according to at least one of a motor cycle signal of the first and second scanning units 110 and 120, a cycle signal of each line of sub-scan direction image data, and a distance cycle signal according to at least one of a scan sub-direction resolution and a scan speed.

FIG. 2B is a block diagram illustrating a structure of an image reading apparatus 200 according to another exemplary embodiment.

Referring to FIG. 2B, the image reading apparatus 200 includes a first scanning unit 210, a second scanning unit 220, an automatic paper transfer unit 230, a controller 240, a first sensor unit 250, and a second sensor unit 260. Detailed descriptions of elements of FIG. 2B overlapping with the elements of FIG. 2A will be omitted herein.

The first sensor unit 250 is installed in a paper entering area of the first scanning unit 210 to sense a transfer of a paper.

The second sensor unit 260 is installed in a paper discharge area of the second scanning unit 220 to sense a discharge of the paper.

If the first sensor unit 250 senses the paper, the controller 240 controls a first light source to start alternate lighting and controls a second light source to start alternate lighting after a preset time elapses.

If the first and second sensor units 250 and 260 do not sense the paper, the controller 240 controls the first and second light sources to stop the alternate lightings of the first and second light sources and to be lit off.

At least one third sensor unit (not shown) may be installed between the first and second sensor units 250 and 260.

Figure 3:
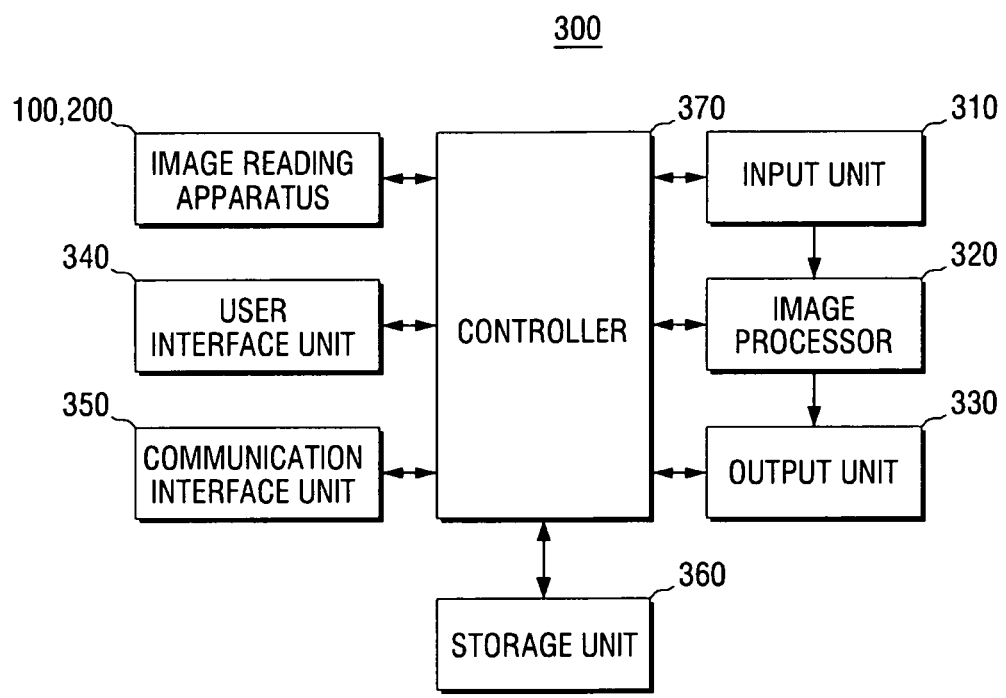
FIG. 3 is a block diagram illustrating a structure of an image forming apparatus according to an exemplary embodiment.

FIG. 3 is a block diagram illustrating a structure of an image forming apparatus 300 according to an exemplary embodiment.

Referring to FIG. 3, the image forming apparatus 300 includes the image reading apparatus 100 or 200 shown in FIG. 2A or 2B, an input unit 310, a rendering unit (not shown), an image processor 320, an output unit 330, a user interface unit 340, a communication interface unit 350, a storage unit 360, and a controller 370.

The image forming apparatus 300 is connected to an external device and outputs document data. The image forming apparatus 300 may be realized as various types such as a printer, a scanner, a copier, a fax machine, a MFP which has at least two or more of functions of the printer, the scanner, the copier, and the fax machine, etc.

A structure of the image reading apparatus 100 or 200 is as described with reference to FIGS. 2A and 2B, and thus its detailed descriptions will be omitted herein.

The input unit 310 receives image data which is to be image-processed.

In more detail, the input unit 310 receives or generates a printed image or a scanned image. In other words, the input unit 310 may receive an image which is generated through an application program or a driver included in a host device (not shown) or a RGB rendering image which is generated through an emulation. In the case of copying, the input unit 310 may receive an image which is scanned by an RGB sensor.

The rendering unit (not shown) converts the image data input through the input unit 310 into bitmap data of an RGB space.

The image processor 320 performs image processing with respect to input data under control of the controller 370.

In more detail, the image processor 320 converts each RGB 8-bit image of each channel into an CMYK color image through a color conversion, improves an image quality of the CMYK color image, and generates the CMYK color image as a-bit image (binary data) through halftoning.

The output unit 330 prints data, which has been image-processed by the image processor 320, on a recording medium and outputs the data under control of the controller 370. The output unit 330 prints an image according to a signal input from the image reading apparatus 100 or 200 or a signal input from an external device such as a personal computer (PC) or the like. The output unit 330 may include a feeding unit which feeds a paper that is a printing medium, a developing unit which develops an image on the paper, a fixing unit which fixes the image, which is developed by applying heat and pressure to the paper, on the paper, and a paper discharging unit which discharges the paper, on which printing has been completed, to the outside.

According to an exemplary embodiment, papers loaded in a paper tray are transferred through a pickup roller to the developing unit. An electrostatic latent image is formed on a surface of a photoreceptor, which is charged with predetermined potential by a charging roller, by an exposing unit. The electrostatic latent image is developed as a toner image by a developing roller and then transferred to the paper by a transfer roller. The toner image transferred to the paper passes between a heating roller and a pressurizing roller of the fixing unit and thus is fixed on the paper due to heat and pressure. The paper which has passed through the fixing unit is transferred by paper discharging rollers and then discharged to the outside.

The user interface unit 340 includes a controlling key (not shown) through which a user command to control an operation of the image forming apparatus 300 is input and a display window (not sown), such as a liquid crystal display (LCD), which displays a state of the image forming apparatus 300. The user interface unit 340 may be realized as a unit which simultaneously realizes an input and an output such as a touch pad or the like.

The user interface unit 340 displays various types of information provided from the image forming apparatus 300, a progress state of a job progressing in the image forming apparatus 300, and a result of the job. A user checks, manages, and controls various types of printing jobs of the image forming apparatus 300 through the user interface unit 340

The communication interface unit 350 supports data communication which is performed with an external (not shown) through a network. For example, the communication interface unit 350 may be realized as a form which supports a digital living network alliance (DLNA) network, a local method, a local area network (LAN), an Internet, or the like. In particular, the communication interface unit 350 receives an image which is generated through an application program or a driver of a host device (not shown) or an RGB rendering image which is generated through an emulation and provides the received image to the input unit 310.

The input unit 310 and the communication interface unit 350 are illustrated as separate structures in FIG. 3. This is only an exemplary embodiment, and thus the communication interface unit 350 may be realized as the input unit 310.

The storage unit 360 may be realized as a storage medium of the image forming apparatus 300 or an external storage medium. For example, the storage unit 360 may be realized as a removable disk including a universal serial bus (USB) memory, a storage medium connected to a host, a web server connected through a network, or the like.

The controller 370 controls operations of elements of the image forming apparatus 300 according to pre-stored various types of programs.

In more detail, the controller 370 controls operations of the input unit 310, the image processor 320, the output unit 330, the user interface unit 340, the communication interface unit 350, and the storage unit 360.

It has been described in the present exemplary embodiment that the above-described all functions are controlled through the elements of the image forming apparatus 300. However, this is only an exemplary embodiment, and thus the above-described all functions may be controlled through a printer driver (not shown) or an application (not shown) of a host device (not shown) connected the image forming apparatus 300.

Figure 4:
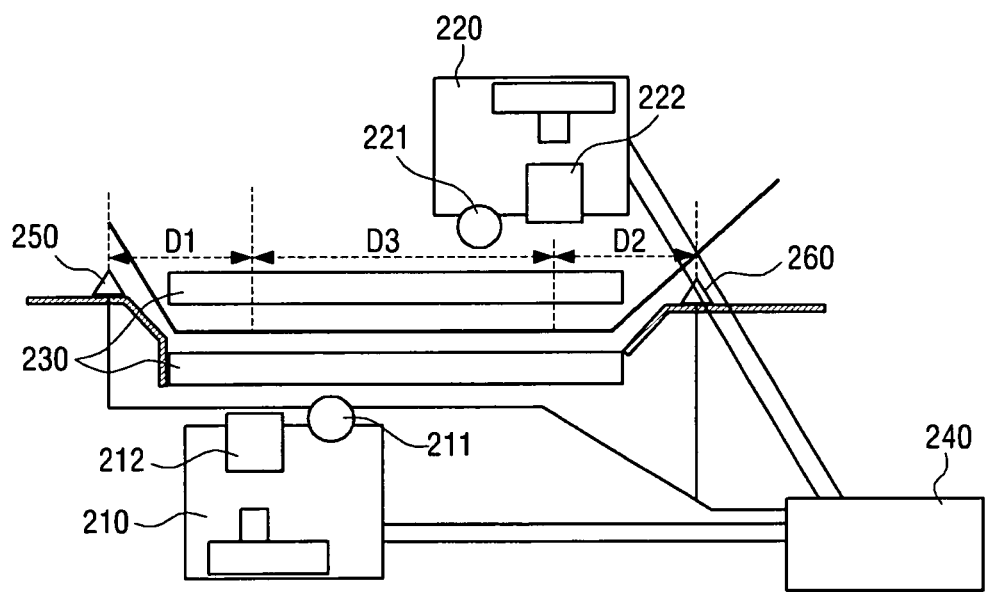
FIG. 4 is a view illustrating an operation of the image reading apparatus of FIG. 2, according to an exemplary embodiment.

FIG. 4 is a view illustrating an operation of the image reading apparatus 200 of FIG. 2B, according to an exemplary embodiment.

Referring to FIG. 4, interference between illuminators 211 and 221 of scan modules 210 and 220 (the first and second scanning units described above) occurring during both-side scanning is reduced. In other words, the first and second light sources 211 and 221 of the scan modules 210 and 220 are controlled to remove or reduce the interference between the illuminators 211 and 221.

As shown in FIG. 4, two sensors 250 and 260 adhere on a paper transfer path of the automatic paper transfer unit 230 to check a feeding state of the paper. In this case, the two sensors 240 transmit a feeding state signal of the paper to the controller 240, and the controller 240 controls the illuminators 211 and 221 using the feeding state signal. Here, the controller 240 may be realized as a scan module controller.

According to an exemplary embodiment, lighting states of the illuminators may be controlled as shown in Table 1 below.

TABLE 1

| First Sensor (S1) | Second Sensor | Lighting States of Illuminators |
|---|---|---|
| OFF | OFF | Light off First and Second Scan Module |
| ON | OFF | Alternately Light on First and Second Scan Modules |
| ON | ON | Alternately Light on First and Second Scan Modules |
| OFF | ON | Alternately Light on First and Second Scan Modules |
| OFF | OFF | Light off First and Second Scan Modules |

If a paper is scanned as shown in Table 1 above, the paper is fed to the first scanning unit 210 by the first sensor 250 which senses a feeding state of the paper. This signal is transmitted to the controller 240, and the illuminators 211 and 221 of the first and second scan modules 210 and 220 start to be alternately lit on through the controller 240.

According to another exemplary embodiment, the lighting states of the illuminators may be controlled as shown in Table 2 below.

TABLE 2

| First Sensor (S1) | Second Sensor (S2) | Lighting States of Illuminators |
|---|---|---|
| OFF | OFF | Light off First and Second Scan Modules |
| ON | OFF | Alternately Light on First and Second Scan Modules |
| ON | ON | Alternately Light on First and Second Scan Modules |
| OFF | ON | Alternately Light on Second Scan Module |
| OFF | OFF | Light off First and Second Scan Modules |

As shown in Table 2 above, if the first and second sensors S1 and S2 are turned on when the illuminators are alternately lit on, the first light source of the first scan module 210 is first lit off.

According to another exemplary embodiment, the lighting states of the illuminators may be controlled as shown in Table 3 above.

TABLE 3

| First Sensor (S1) | Second Sensor (S2) | Lighting States of Illuminators |
|---|---|---|
| OFF | OFF | Light off First and Second Scan Module |
| ON | OFF | Light on First Scan Module, and then Light on Second Scan Module after Predetermined Time |
| ON | ON | Alternately Light off First and Light on First Scan Module |
| OFF | ON | Alternately Light on Second Scan Module |
| OFF | OFF | Light off First and Second Scan Module |

If first and second sensors S1 and S2 are turned off when the illuminators are alternately lit on as shown in Table 3 above, the first light source of the first scan module 210 is first lit on, and then the second light source of the second scan module 220 is lit on after a predetermined time. In more detail, the second light source of the second scan module 220 is lit on after a time corresponding to a distance D1 shown in FIG. 4.

According to another exemplary embodiment, the lighting states of the illuminators may be controlled as shown in Table 4 below.

TABLE 4

| First Sensor (S1) | Second Sensor (S2) | Lighting States of Illuminators |
|---|---|---|
| OFF | OFF | Light off First and Second Scan Modules |
| ON | OFF | Light on First Scan Module, and then Light on Second Scan Module after Predetermined Time |
| ON | ON | Alternately Light on First and Second Scan Module |
| OFF | ON | Alternately Light on First and Second Scan Modules |
| OFF | OFF | Light off First and Second Scan Modules |

As shown in Table 4 above, the lighting states shown in Tables 2 and 3 are combined to control the lighting states of the illuminators.

As described above, times when alternate lighting starts and ends may be adjusted according to the number and positions of paper sensors.

Figure 5:
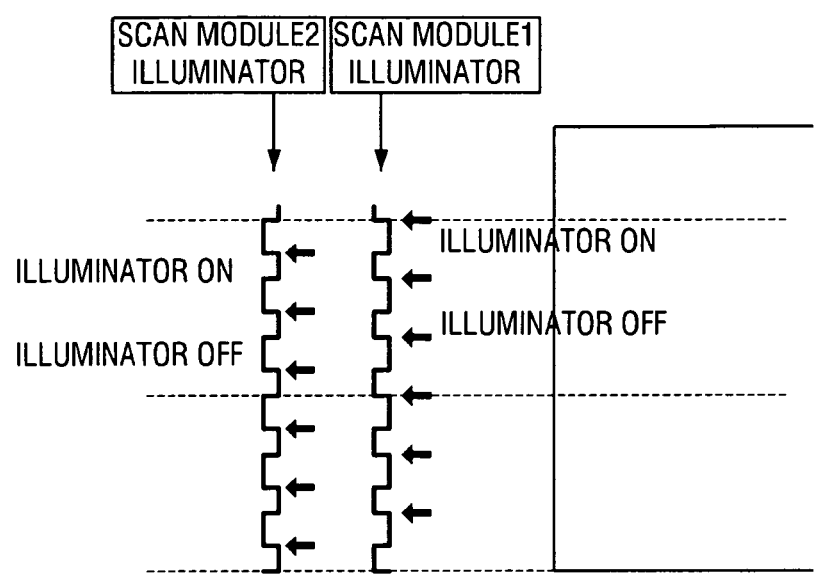
FIG. 5 is a view illustrating a method for controlling alternate lighting according to an exemplary embodiment.

FIG. 5 is a view illustrating a method for controlling alternate lighting according to an exemplary embodiment.

Referring to FIG. 5, first and second scan modules 210 and 220 synchronize with each other according to a preset signal. Also, the first and second scan modules 210 and 220 are alternately lit at least one or more times for a cycle of the preset signal.

Here, a sync signal may be at least one of line times, shutter times, and scan sub-direction cycle signals of light-receiving units of the first and second scan modules, i.e., image sensors 212 and 222.

Here, the scan sub-direction cycle signals may include at least one of motor cycle signals of the first and second scan modules 210 and 220, a line cycle signal of sub-scan direction image data, a scan sub-direction resolution, and a distance cycle signal which depends on a scan speed.

The controller 240 controls the first and second scan modules 210 and 220 so that a constant time interval occurs between on times of illuminators of the first and second scan modules 210 and 220. In other words, since the first and second scan modules 210 and 220 require different light amounts, the illuminators may be lit on for an appropriate time.

For example, if there are optimal conditions that the first scan module 210 has light for 35% time of one-time alternate cycle, and the second scan module 220 has light for 45% time of one-time alternate cycle, the illuminators of the first and second scan modules 210 and 220 may be lit off only for 20% time of one-time cycle. This time may be a time difference between the first and second scan modules 210 and 220. Here, the time may be adjusted to 90% of maximum spec at which light amounts of light-receiving units are saturated, to improve an image-quality.

The first and second scan modules 210 and 220 may extend to be lit on a plurality of times within an alternate cycle.

If a preset signal is a scan sub-direction signal, the preset signal may be controlled by a method of using 600 dpi and 300 dpi in scanning.

A distance of scan sub-direction varies during 600 dpi and 300 dpi operations. In other words, since the distance of the scan sub-direction varies according to a scan direction resolution and a scan speed, an alternate lighting time may be adjusted to this time. Therefore, a distance depending on at least one of a scan direction resolution and a scan speed may be made and used as a table. For example, in the case of 300 dpi and 600 dpi, the distance may be set to a multiple relation to be simply controlled.

As described above, first and second scan modules may be alternately lit on so that light of the second scan module does not go into the first scan module or an opposite direction. Therefore, an image deterioration, such as back side showing or the like, does not occur, and a clear image quality may be obtained through a light source control.

Figure 6:
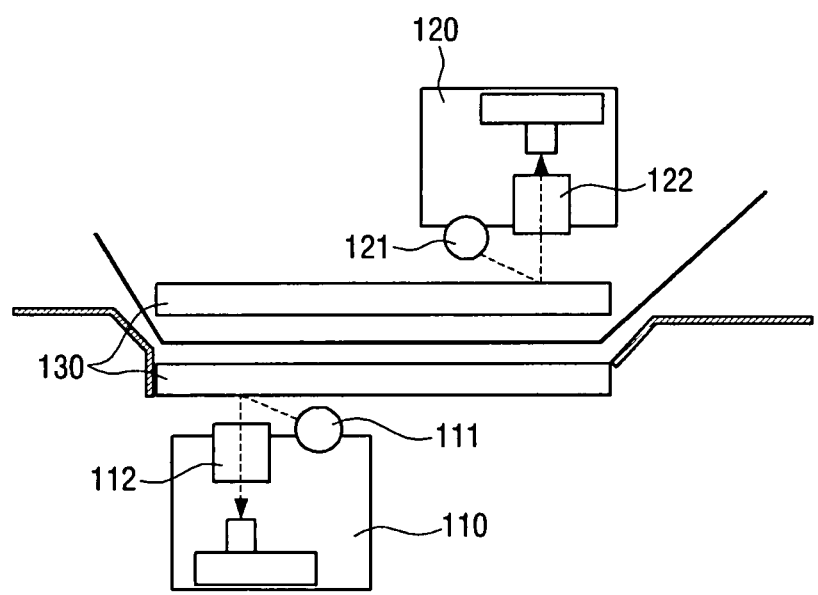
FIG. 6 is a view illustrating a method for radiating light in both-side scanning according to an exemplary embodiment.

FIG. 6 is a view illustrating a method for radiating light in both-side scanning according to an exemplary embodiment.

Referring to FIG. 6, when both sides of a paper are scanned, a light amount of a first light source 111 is radiated onto a first sensor 112 to read image data, and a light amount of a second light source 121 is radiated onto a second sensor 122 to read image data.

Figure 7A:
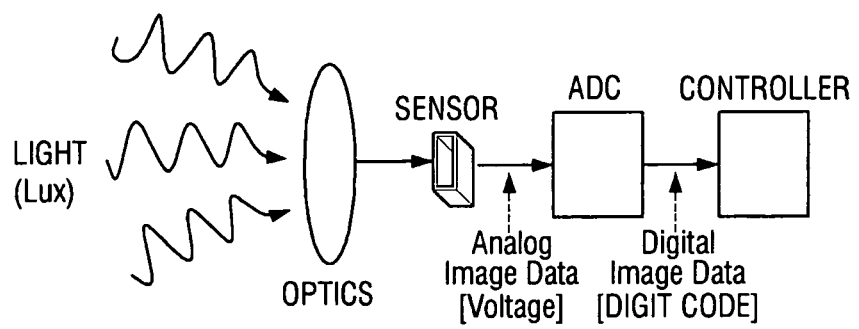
FIGS. 7A and 7B are views illustrating an image data conversion process according to an exemplary embodiment.
Figure 7B:
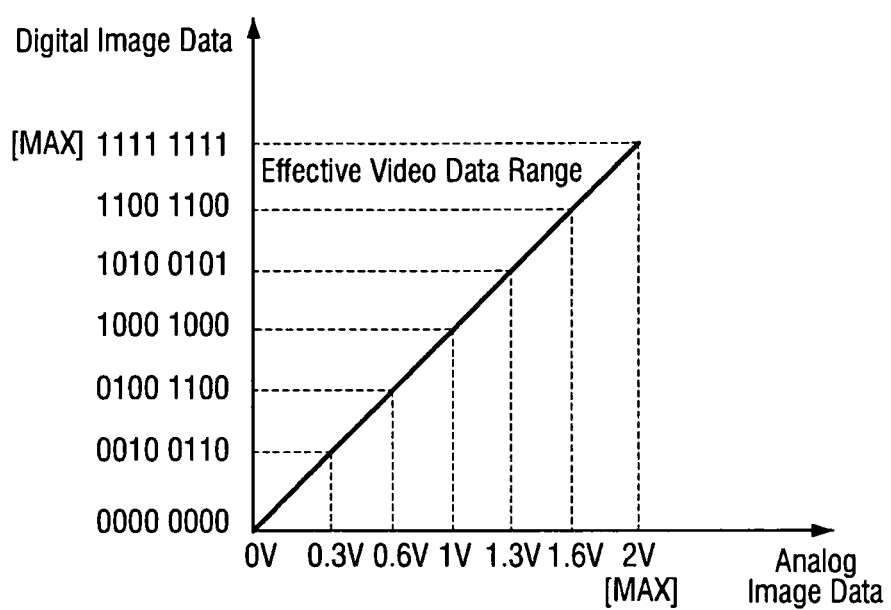

FIGS. 7A and 7B are views illustrating an image data conversion process according to an exemplary embodiment.

As shown in FIG. 7A, light amounts which are image data respectively read by first and second scan modules 110 and 120 are converted into voltages which are analog data and then into digital codes through an analog-to-digital converter (ADC).

The ADC limits voltage ranges of the analog image data, which are input conditions, to convert the analog data into the digital codes.

As shown in FIG. 7B, analog image data is converted into digital image data within a constant range of the analog image data. Since other areas are values which cannot be expressed by the ADC, a scan module converts the analog image data into the digital codes within a limit of the analog image data.

For example, image data is expressed within a range between 0V and 2V to express an image using $2^8$ (256) level, thereby normally expressing the image. Therefore, if the image data is expressed within a range between 0V and 3V, the image is not expressed well.

In general, since sensitivity of a sensor or luminance of a light source varies according to a scan module, an output amount of analog image data varies. However, it is difficult to vary a light-receiving unit such as a charge-coupled device (CCD). If a maximum light amount exceeds a limit of a range as shown in Table 5 below, a light amount of the light source is controlled to adjust luminance thereof not to exceed the limit.

In other words, light is periodically on/off to adjust a maximum output amount of analog image data which is a final output of each scan module. If analog image data exceeds a full (max) range spec, an image is not expressed. If the analog image data does not exceed the full range spec, the image is not expressed. Therefore, a maximum amount of the analog image data may be adjusted to 90% of a maximum amount.

For example, the maximum amount of the analog image data is as shown in Table 5 below.

TABLE 5

|  | Scan Module 1 | Scan Module 2 |
|---|---|---|
| CCD Sensitivity | 10 V/lx · s | 8 V/lx · s |
| Light Source Luminance | 2500 lux | 3500 lux |
| Analog Image Data (Full Range) | 2.1 V | 2.3 V |
| Analog Image Data (Light Source On/Off Control) | 1.8 V | 1.8 V |

Alternate lighting is performed a plurality of times within a line time cycle of the CCD to reduce tolerance of a light amount, thereby reducing tolerance of an image.

Figure 8A:
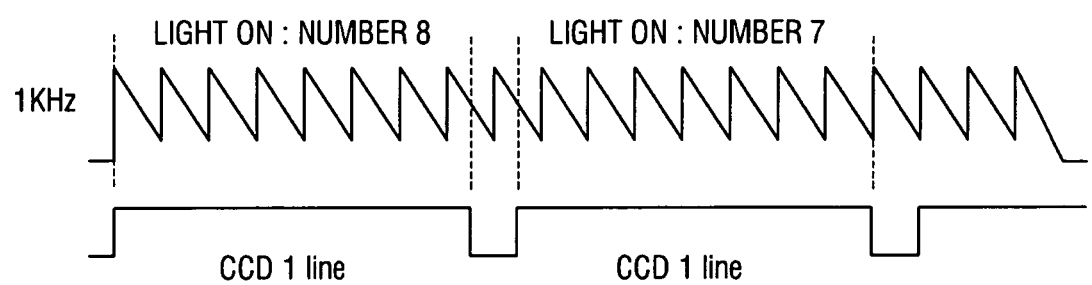
FIGS. 8A and 8B are views illustrating a method for adjusting a light source according to various exemplary embodiments.
Figure 8B:
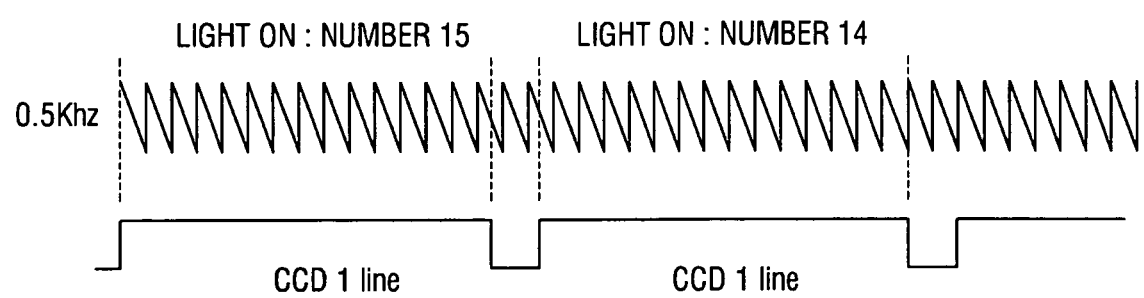

In other words, if a light source is on/off at 1 Khz as shown in FIG. 8A and on/off at 0.5 Khz as shown in FIG. 8B, the number of times of on/off varies according to a frequency of light within a line time cycle.

In the case of FIG. 8A, a deviation of a light amount is 12.5% (100×(8−7)/8)) within each line time. In the case of 8B, a deviation of a light amount is 6.6% (100×15−14)/15) within each line time. Therefore, as the light amount is quickly on/off, the deviation of the light amount is reduced.

The light amount affects an image quality. Therefore, noise of 12.5% occurs in a video image in FIG. 8A, and noise of 6.6% occurs in the video image in FIG. 8B.

For example, if a light source flickers two times in 600 dpi scanning, 1200 dpi scanning effect shows. Therefore, a plurality of times of flickering of the light source generate a resolution effect.

As described above, lighting may be alternately performed a plurality of times within a cycle of a line time signal of an image sensor of a light-receiving unit to make image data clear.

In terms of characteristics of a light source, a lamp, such as a CCFL or an Xe-lamp, may operate within a range between 50 Khz and 100 Khz, and an LED may operate at 200 Khz or less in consideration of an LED driver and an LED switching response.

The following process may be possible.

A light source is adjusted to specific frequency of 200 Khz in consideration of a response time thereof. Also, a sensor output level is checked to check whether an appropriate light amount is output, using pre-processing for image correction such as shading correction to search for a further accurate frequency, thereby controlling a frequency and a cycle.

Figure 9:
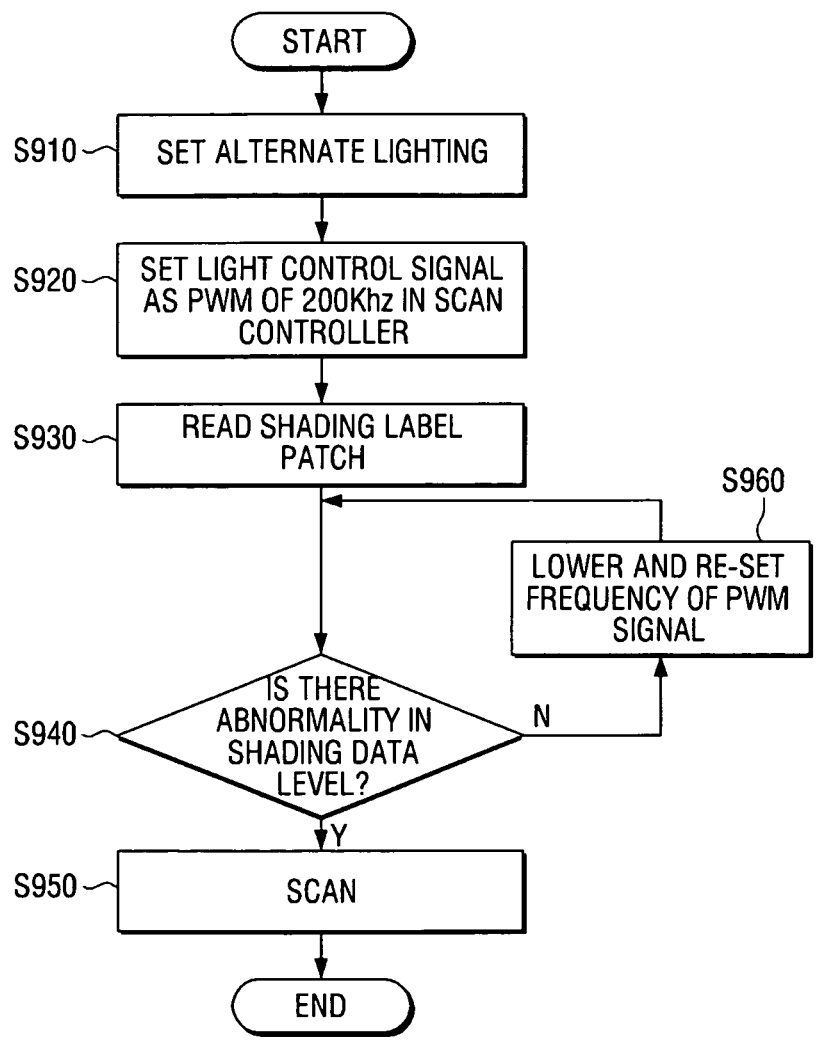
FIG. 9 is a flowchart illustrating a scan controlling method according to an exemplary embodiment.

In more detail, a process for alternate lighting for image correction may be made and used as shown in FIG. 9. First, alternate lighting is set (S910).

A scan controller sets a light source control signal as an operation signal of 200 Khz to light on/off a light source signal (S920).

An LED is repeatedly lit on/off at 200 Khz to read a shading level patch (S930). Whether there is an abnormality in a shading data level is checked (S940).

If there is no abnormality in the shading data level (S940: Y), this value is used in a scanning operation (S950).

If there is the abnormality in the shading level (S940:N), a frequency and duty of a light on/off (PWM) signal are adjusted (S960).

The shading data level is re-checked to search for and set a normal value. In this case, the normal value may be set to lower a frequency and increase an on-duty time of duty.

Figure 10A:
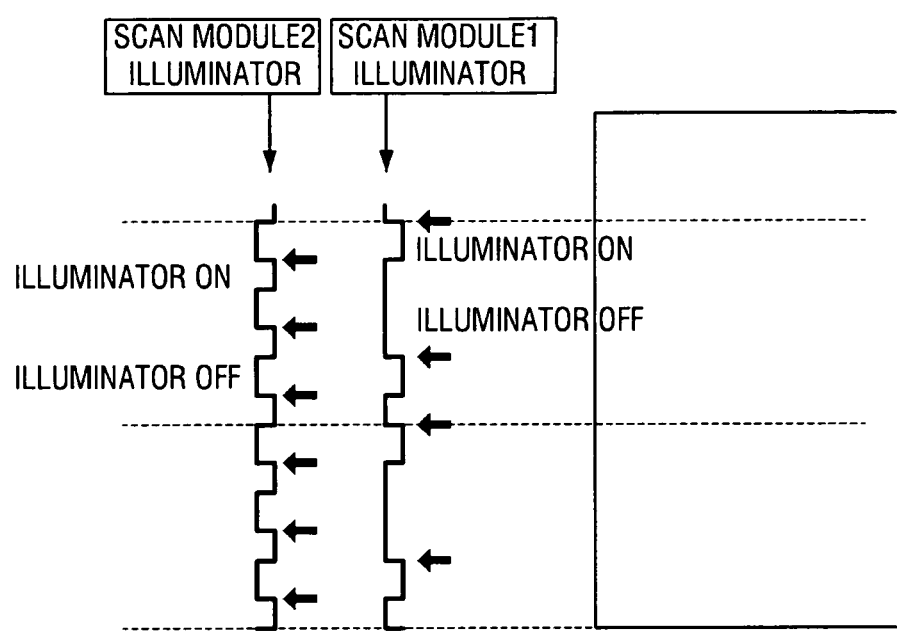
FIGS. 10A through 10C are views illustrating a method for controlling an illuminator according to various exemplary embodiments.
Figure 10B:
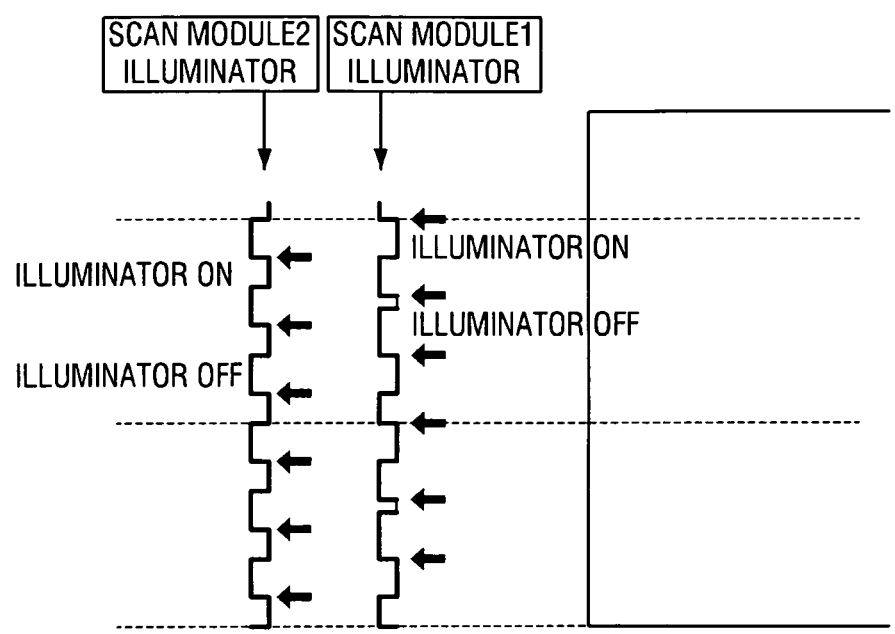
Figure 10C:
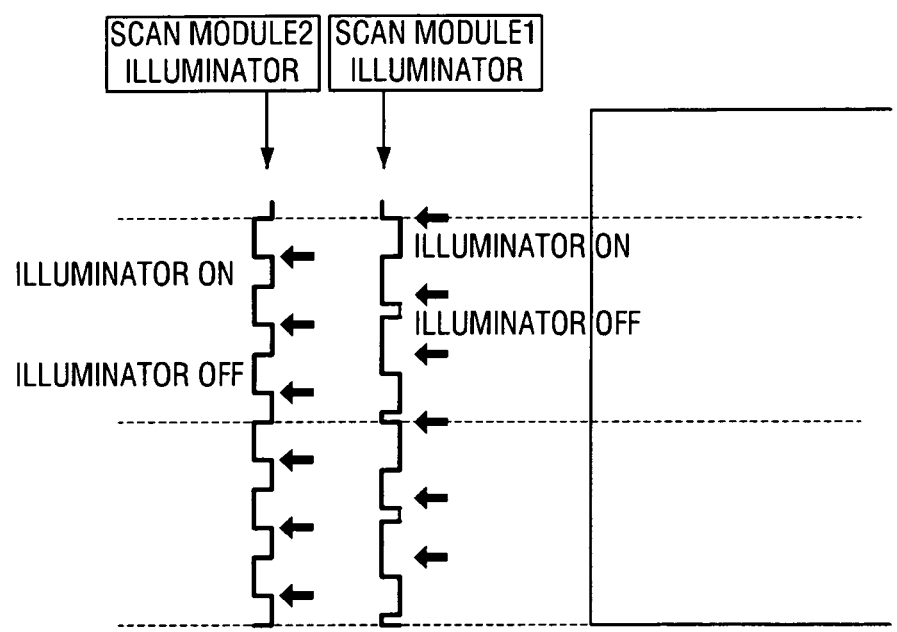

FIGS. 10A through 10C are views illustrating alternate lighting according to various exemplary embodiments.

As shown in FIG. 10A, first and second modules are controlled to be lit on different times in alternate lighting.

For example, an illuminator of the first scan module scanning a first side of a paper is lit on and then is lit off after a predetermined time. An illuminator of the second scan module is lit on after a predetermined time. As described above, alternate lightings synchronize with each other according to a preset signal, and the number of lightings of the illuminator of the first scan module and the number of lightings of the illuminator of the second scan module are set to be different from each other within a cycle of the present signal.

Here, the preset signal may be at least one of a line time (shutter time) signal and a scan sub-direction cycle signal of the above-described light-receiving unit.

As shown in FIG. 10B, there is a method for adjusting duty of a lighting time.

In more detail, an illuminator of a first scan module scanning a first side of a paper is lit on and the lit off after a predetermined time, and an illuminator of a second scan module is lit on after a predetermined time. Theses alternate lightings synchronize with each other according to a preset signal. In this case, lighting times, i.e., duty, of the illuminators of the first and second scan modules, are adjusted so that the illuminators of the first and second scan modules are alternately lit on within a cycle of the preset signal.

Here, the preset signal may be at least one of a line time (shutter time) signal and a scan sub-direction cycle signal of the above light-receiving unit.

As shown in FIG. 10C, there is a method for repeatedly using alternate lightings.

In more detail, an illuminator of a first scan module scanning a first side of a paper is lit on and then is lit off after a predetermined time, and an illuminator of a second scan module is lit on after a predetermined time. These alternate lightings synchronize with each other according to a specific signal. In this case, the illuminators of the first and second scan modules are alternately lit on with a cycle of the specific signal. If an image effect according to illuminator interference is lower, alternating lighting times of the illuminators overlaps with each other.

This is related to image processing (IP). However, interference may be set to about 1%, and interference of a paper having simple texts may be set to 10% or less.

According to another exemplary embodiment, not alternate lighting but light of an illuminator of a scan module is slightly radiated so that back side showing does not affect an image. There may be the following method.

If light of an illuminator is slightly radiated although an effect of the light is small, back side showing does not occur, but an image quality is poor due to the slight light. Therefore, a light source is adjusted as described above, and a gain factor of image data is automatically changed by an adjusted amount of light of the light source.

For example, a PGA factor of an FE is adjusted or light is added to image data by a reduced amount. Alternatively, a ratio of shading data stored in a memory may be adjusted by the reduced amount to adjust input image data, thereby making an image quality further clear. In other words, image data is compensated by a reduced intensity of light so that back side showing does not occur. In general, since an amount of light and image data are directly proportional to each other, the image data may be increased two times if the amount of light is reduced to 50%.

Figure 11:
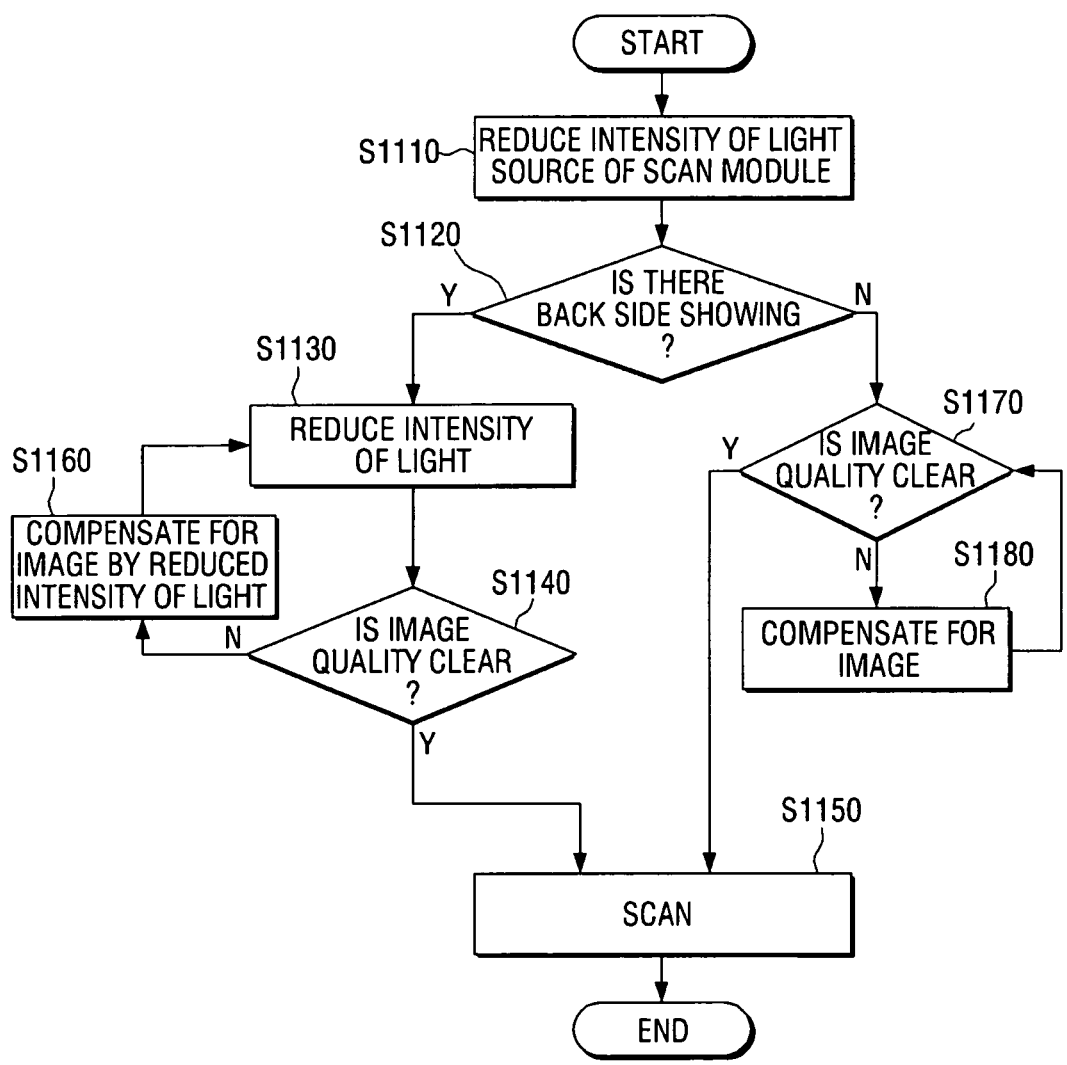
FIG. 11 is a flowchart illustrating a scan controlling method according to another exemplary embodiment.

FIG. 11 is a flowchart illustrating a scanning method according to an exemplary embodiment.

A scan controller reduces the intensity of the light source of the scan module (S1110). Then, it is determined if a back side of the paper is showing (S1120). If the back side is showing (S1120:Y) then intensity of the light source is further reduced (S1130). Subsequently, it is determined if the image quality is clear (S1140). If the image quality is clear (S1140:Y), the a scanning operation is performed (S1150). If the image quality is not clear (S1140:N) the image is compensated (S1160) and the method returns to Operation S1130.

If the back side is not showing (S1120:N) then it is determined if the image quality is clear (S1170). If the image quality is clear (S1170:Y), the a scanning operation is performed (S1150). If the image quality is not clear (S1170:N) the image is compensated (S1180) and the method returns to Operation S1170.

In the present exemplary embodiment, an image quality clearness determining block may be omitted. This is because an amount of light and image data are directly proportional to each other, and a reduced amount of the light can be checked in advance. An image quality clearness determination is performed by reading a specific pattern using a scan module and comparing a value of the specific pattern with an original value. In other words, a part of the specific pattern is read to reduce an image quality clearness determination time of operations of FIG. 11. Also, back side showing may be determined using this.

There is a method for measuring temperatures of light source parts of first and second scan modules to check lighting on/off states of light sources.

A thermometer and a temperature measurer which measure temperature temperate of parts around of light sources of scan modules are installed to check lighting states of the scan modules in alternate lighting. Therefore, lighting states are checked using measured temperatures to be used in the alternate lighting.

Accordingly, back side showing occurring due to crosstalk of illuminators of two scan modules in both-side scanning is prevented. Also, if an image is affected by controlling of the illuminators, this is compensated to read a clear image.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image reading apparatus supporting a both-side scan mode, the image reading apparatus comprising:
    an automatic paper transfer unit which automatically transfers a paper;
    a first scanning unit which comprises a first light source and scans a first side of the paper;
    a second scanning unit which comprises a second light source and scans a second side of the paper; and
    a controller which controls the first and second light sources to be alternately lit on a plurality of times within a cycle of a preset signal when the paper is transferred to the automatic paper transfer unit,
    wherein the cycle of a preset signal is one cycle of a line time of image sensors or a scan sub-direction cycle of the first and second scanning units.

2. The image reading apparatus as claimed in claim 1, wherein the first and second scanning units respectively further comprise image sensors which convert optical signal obtained by reading the paper into electric signals,
    wherein the controller controls the first and second light sources to be alternately lit on a plurality of times for the one cycle of a line time of the image sensors.

3. The image reading apparatus as claimed in claim 1, wherein the controller controls the first and second light sources to be alternately lit on for the scan sub-direction cycle of the first and second scanning units.

4. The image reading apparatus as claimed in claim 1, wherein the controller controls the first and second light sources to be lit on the different numbers of times for one cycle of the preset signal.

5. The image reading apparatus as claimed in claim 1, wherein the controller controls the first and second light sources so that lighting duties of the first and second light sources are different from each other for one cycle of the preset signal.

6. The image reading apparatus as claimed in claim 1, wherein the controller controls the first and second light sources to be repeatedly lit on for a preset time within one cycle of the preset signal.

7. The image reading apparatus as claimed in claim 1, wherein the controller controls the first and second light sources to be repeatedly lit off for a preset time within one cycle of the preset signal.

8. The image reading apparatus as claimed in claim 3, wherein the controller controls alternate lighting cycles of the first and second light sources according to a distance cycle signal which depends on at least one of a motor cycle signal of the first and second scanning units, a line cycle signal of sub-scan direction image data, a scan sub-direction resolution, and a scan speed.

9. The image reading apparatus as claimed in claim 1, further comprising:
    a first sensor unit which is installed in a paper entering area of the automatic paper transfer unit; and
    a second sensor unit which is installed in a paper discharging area of the automatic paper transfer unit,
    wherein the controller controls the first and second light sources to be alternately lit on based on sensing results of the first and second sensor units.

10. The image reading apparatus as claimed in claim 1, wherein the controller controls light amounts of the first and second light sources in the alternate lighting to be different from each other and controls a scanned image to be compensated according to the adjusted light amounts.

11. A method for controlling an image reading apparatus which supports a both-side scan mode and comprises an automatic paper transfer unit which automatically transfers a paper, a first scanning unit which comprises a first light source and scans a first side of the paper, and a second scanning unit which comprises a second light source and scans a second side of the paper, the method comprising:
    receiving a user command for both-side scanning; and
    alternately lighting on the first and second light sources a plurality of times for one cycle of a preset signal when the paper is transferred to the automatic paper transfer unit according to the user command,
    wherein the cycle of a preset signal is one cycle of a line time of image sensors or a scan sub-direction cycle of the first and second scanning units.

12. The method as claimed in claim 11, wherein the first and second scanning units respectively further comprise image sensors which convert optical signal obtained by reading the paper into electric signals, wherein the first and second light sources are alternately lit on a plurality of times for the one cycle of a line time of the image sensors.

13. The method as claimed in claim 11, wherein the first and second light sources are alternately lit on a plurality of times for the scan sub-direction cycle of the first and second scanning units.

14. The method as claimed in claim 11, wherein the first and second light sources are lit on the different numbers of times for one cycle of the preset signal.

15. The method as claimed in claim 11, wherein the first and second light sources are alternately lit on a plurality of times so that lighting duties of the first and second light sources are different from each other for one cycle of the preset signal.

16. The method as claimed in claim 11, wherein the first and second light sources are repeatedly lit on for a preset time within one cycle of the preset signal.

17. The method as claimed in claim 11, wherein the first and second light sources are repeatedly lit off for a preset time within one cycle of the preset signal.

18. The method as claimed in claim 13, wherein alternate lighting cycles of the first and second light sources are controlled according to a distance cycle signal which depends on at least one of a motor cycle signal of the first and second scanning units, a line cycle signal of sub-scan direction image data, a scan sub-direction resolution, and a scan speed.

19. The method as claimed in claim 11, wherein the image reading apparatus further comprises:

a first sensor unit which is installed in a paper entering area of the automatic paper transfer unit; and a second sensor unit which is installed in a paper discharging area of the automatic paper transfer unit, wherein the first and second light sources are alternately lit on based on sensing results of the first and second sensor units.

20. The method as claimed in claim 11, further comprising controlling light amounts of the first and second light sources in the alternate lighting to be different from each other and controlling a scanned image to be compensated according to the adjusted light amounts.

* * * * *